(12) United States Patent
Arena

(10) Patent No.: US 6,783,829 B2
(45) Date of Patent: Aug. 31, 2004

(54) ADVERTISING MAT

(76) Inventor: Richard J. Arena, 830 Jones Rd., Roswell, GA (US) 30075

(*) Notice: Subject to any disclaimer, the term of this patent is extended or adjusted under 35 U.S.C. 154(b) by 4 days.

(21) Appl. No.: 10/326,478

(22) Filed: Dec. 19, 2002

(65) Prior Publication Data

US 2003/0152744 A1 Aug. 14, 2003

(51) Int. Cl.[7] ................................................ B32B 3/00
(52) U.S. Cl. ..................... 428/40.1; 15/215; 15/216; 428/42.1; 428/42.2; 428/42.3; 428/43; 428/67; 428/137; 428/138; 428/192; 428/194
(58) Field of Search .............................. 428/40.1, 42.1, 428/42.2, 42.3, 43, 67, 137, 138, 192, 194; 15/215, 216

(56) References Cited

U.S. PATENT DOCUMENTS

| | | | | |
|---|---|---|---|---|
| 3,078,490 A | | 2/1963 | Etcher | 15/216 |
| 3,911,520 A | * | 10/1975 | Tupper | 15/215 |
| 3,930,084 A | * | 12/1975 | Shields | 428/67 |
| 6,417,778 B2 | | 7/2002 | Blum et al. | 340/815.4 |
| 6,507,285 B2 | * | 1/2003 | Blum | 15/215 |
| 2002/0023308 A1 | | 2/2002 | Blum et al. | 15/104.002 |
| 2002/0028313 A1 | | 3/2002 | Blum et al. | 428/54 |
| 2002/0071936 A1 | | 6/2002 | Gentiluomo et al. | 428/167 |
| 2002/0092110 A1 | | 7/2002 | Blum et al. | 15/215 |
| 2002/0156634 A1 | | 10/2002 | Blum et al. | 704/270 |

* cited by examiner

*Primary Examiner*—Nasser Ahmad
(74) *Attorney, Agent, or Firm*—Thomas, Kayden, Horstemeyer & Risley

(57) ABSTRACT

An advertising mat including a floor mat having a bottom surface for engaging a floor and an upper surface over which pedestrian traffic will pass. The mat upper surface includes a traffic section adapted for placement in a pedestrian path, and at least one side section having a plurality of hold down tabs. The side section is adjacent the traffic section. A panel including a top surface bearing advertising indicia is configured for placement in the side section. The plurality of hold down tabs releasably secures the panel in the side section.

18 Claims, 4 Drawing Sheets

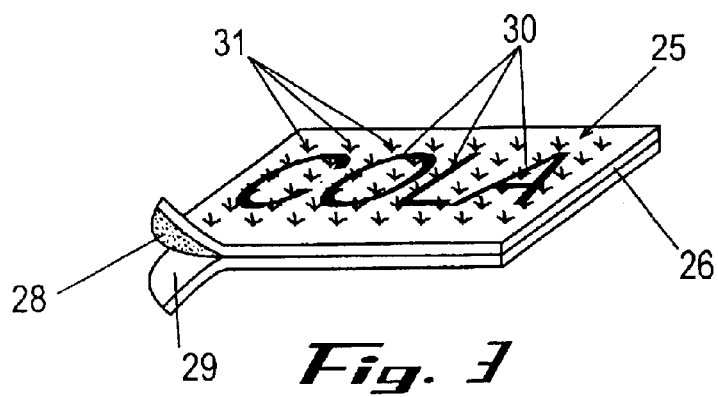
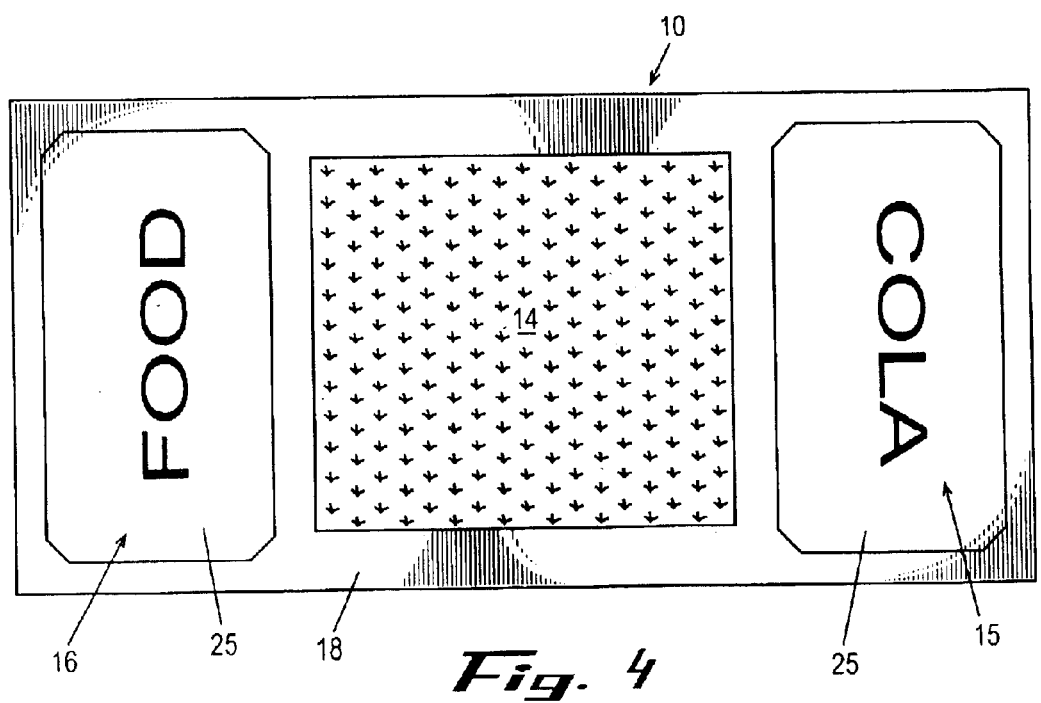

ADVERTISING MAT

FIELD OF THE INVENTION

This invention relates to an advertising mat of the type that is placed on the floor and can be used in high pedestrian traffic establishments, such as in stores, factories, office buildings, sports facilities, and apartment buildings where there is pedestrian traffic. More particularly, the invention relates to an advertising mat which can include easily replaceable advertising panels adjacent the predicted path of the customers of the store.

BACKGROUND OF THE INVENTION

In the environment of heavy pedestrian traffic, such as in a retail store, sports arena, factory, apartment building, etc., heavy customer traffic is predictable in certain areas of the building, particularly at the entrance and exit of the building, and along certain aisles and in front of certain counters. In many instances, the customer traffic pattern can be accurately predicted and mats are laid in the predicted paths. The mats have the function of cleaning the customer's feet and maintaining the floor of a store in clean condition.

Because of the accumulation of dirt, etc. on the typical mat, the store management requires that the mats be cleaned and/or replaced on a periodic basis, and the cost of the maintenance and replacement of the mats usually is paid for by the store as part of the store overhead.

In some instances, certain product manufacturers have developed floor mats that bear advertisements of goods offered for sale in the store. These advertising mats are a benefit to the store in that they perform the cleaning function described above, and the company advertising its goods typically will pay for some, if not all, of the expense in manufacturing and placing the mats. However, the customers typically walk on the face of the mat and the dirt, grime, etc. from the feet of the customers accumulates on the face of the mat. The advertising mats that display the advertising in the same area that is also used to remove and trap soil from the feet of the pedestrian have disadvantages. One is the advertising message is quickly soiled. Another is some graphic techniques, such as flocking, wear out quickly. This results in frequent replacement of the mats by the supplier. If the mats are not frequently replaced, the graphics of the mat will become so tarnished and undesirable in appearance and the customers viewing the mats will not receive a positive image of the advertised product, and the mats fail to provide the positive, upbeat image of the advertised product.

Accordingly, this invention addresses the above noted problem of deterioration of the image of floor mats in advertising goods of the store and providing a mat that has a changeable advertising surface.

SUMMARY OF THE INVENTION

Briefly described, the present invention comprises an advertising mat for use in high traffic areas of retail stores and other sales facilities, whereby a rubberized mat is placed in the predicted traffic path of customers of the store for providing visual advertisements of products and services of the store or products and services offered elsewhere. Particularly, the floor mat can be formed of a rubberized material having a bottom surface for engaging a floor and an upper surface over which pedestrian traffic will pass. The floor mat upper surface includes a central section adapted for placement in a pedestrian path and for engagement by pedestrian traffic. Opposed side sections straddle the central section of the mat and are intended for placement adjacent pedestrian traffic where they are visible to the pedestrian walking on or near the floor mat. Each said opposed side section can have a substantially smooth upper surface compatible with supporting an advertising mat and/or a graphics sheet. Graphics sheets are mountable on the upper surfaces of the side sections of the floor mat. Each graphics sheet can have opposed upper and lower surfaces, the upper surfaces of the graphics sheets bearing advertising indicia and the lower surfaces of the graphics sheets bearing releasable adhesive. One graphics sheet is disposed in each of the side sections.

Another embodiment of the present floor mat provides a floor mat having a bottom surface for engaging a floor and an upper surface over which pedestrian traffic will pass. The floor mat upper surface includes a traffic section adapted for placement in a pedestrian path, and at least one side section having a plurality of hold down tabs. The side section is adjacent the traffic section. An advertising mat or panel including a top surface bearing advertising indicia is configured for placement in the side section. The plurality of hold down tabs releasably secures the panel in the side section.

In practice, the mats will be supplied to a retail store, etc. for use at the entrance and other high pedestrian traffic areas of the store, with the central section of the mat placed in the anticipated pedestrian path and the wings of the mats straddling the pedestrian path, with the advertisements in the wings of the mat. This straddling relationship of the advertisements with respect to the predicted pedestrian path across the mat typically removes the graphics sheets from most of the pedestrian travel, so that the graphics sheets will have a longer life span than if placed directly in the pedestrian path, and will be subject to less soiling.

Another feature of the invention is the releasable adhesive utilized to apply the graphics sheets to the side sections of the mat. This allows the advertisers to frequently replace the graphics sheets on the mat, by peeling the previously used graphics sheets from the mat and then applying new graphics sheets to the side sections of the mat.

The top surface of the mat is configured so as to provide a border that protects the graphics sheets from accidental engagement at their edges by the feet of pedestrians, thereby tending to avoid inadvertent peeling away of the graphics sheets from the mat and tripping of the pedestrians.

Another embodiment of the present invention is a process for fabricating an advertising floor mat. The process includes the steps of providing a rubberized mat having a bottom surface for placing on the floor of a building structure and an opposed upwardly facing surface; disposing a plate on the upper surface, the plate having a top surface; elevating the temperature that the mat and the plate are exposed to; exerting force on the plate such that the plate is forced into the mat; removing the plate from the mat, thereby forming a recess having a raised border in the upper surface of the mat; and placing a panel bearing advertising indicia in the recess.

Thus, it is an object of this invention to provide an improved advertising mat for use in high traffic retail stores and other commercial locations for the purpose of advertising goods that can be purchased in the establishment.

Another object of this invention is to provide an advertising mat that can be utilized in predicted pedestrian paths, with graphics sheets straddling the pedestrian paths.

Other objects, features and advantages of the present invention will become apparent upon reading the following specification, when taken in conjunction with the accompanying drawings. It is intended that all such additional objects, features and advantages be included within this description, be within the scope of the invention, and be protected by the accompanying claims.

BRIEF DESCRIPTION OF THE DRAWINGS

The advertising mat can be better understood with reference to the following drawings. The components in the drawings are not necessarily to scale, emphasis instead being placed upon clearly illustrating the principle of the advertising mat. Moreover, in the drawings, like reference numerals designate corresponding parts throughout the several views.

FIG. 3 is a perspective illustration of one of the graphics sheets, with a corner of the adhesive protective sheet pulled away from the bottom surface of the graphics sheet, and illustrating the adhesive applied to the bottom surface of the graphics sheet.

FIG. 4 is a plan view of another preferred embodiment of the advertising mat.

Figure 1:
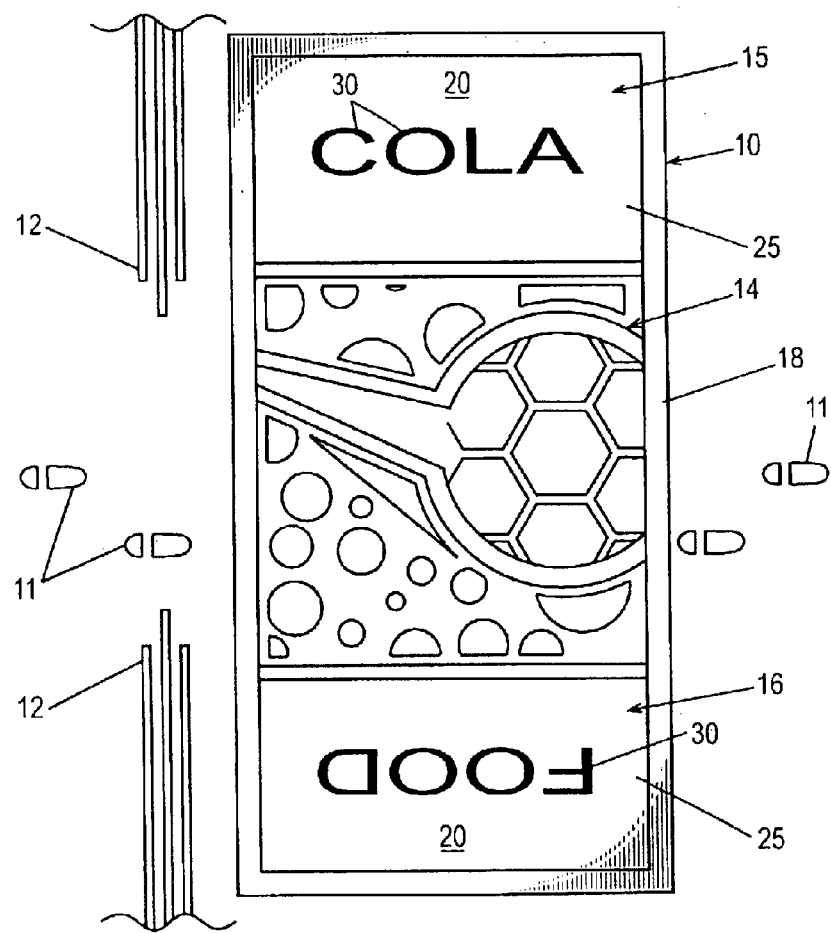
FIG. 1 is a plan view of the advertising mat, showing the predicted path of the pedestrians across the mat at the entrance of a retail establishment.

Reference will now be made in detail to the description of the advertising mat as illustrated in the drawings. While the advertising mat will be described in connection with these drawings, there is no intent to limit the advertising mat to the embodiment or embodiments disclosed therein. On the contrary, the intent is to cover all alternatives, modifications, and equivalents included within the spirit and scope of the advertising mat as defined by the appended claims.

DETAILED DESCRIPTION

Referring now in more detail to the drawings, in which like numerals indicate like parts throughout the several views, FIG. 1 illustrates an advertising mat 10 that is to be applied to the floor surface of a retail establishment in an anticipated pedestrian path. The pedestrian path is indicated by the footprints 11 extending toward and away from the mat and possibly through doors 12.

The mat is formed of a rubberized material having a substantially flat bottom surface (not shown) that can be textured for avoiding slipping or skidding on the surface of the floor of the establishment. The mat material can be rubber, vinyl, or a combination of materials such as rubber and vinyl, for presenting a friendly, safe pedestrian surface and providing durability for the user.

While other dimensions can be used, a typical floor mat can be 6 feet long and 3 feet wide, and have a central section 14 and opposed side sections 15 and 16 that straddle the central section 14. Typically the central section 14 will be approximately 3 feet in length and 3 feet in width, whereas the opposed side sections each will be 1-½ feet in length and 3 feet in width. Also, the mat will be placed with its length extending transverse to the anticipated pedestrian path 11, so that only the central section 14 is expected to be heavily traveled by the pedestrian traffic. The opposed side sections 15 and 16 will be placed adjacent, in straddling relationship, with respect to both the central section 14 and the anticipated pedestrian path 11. The central section can be made of a permanent material, usually of the same material of the entire floor mat.

Figure 2:
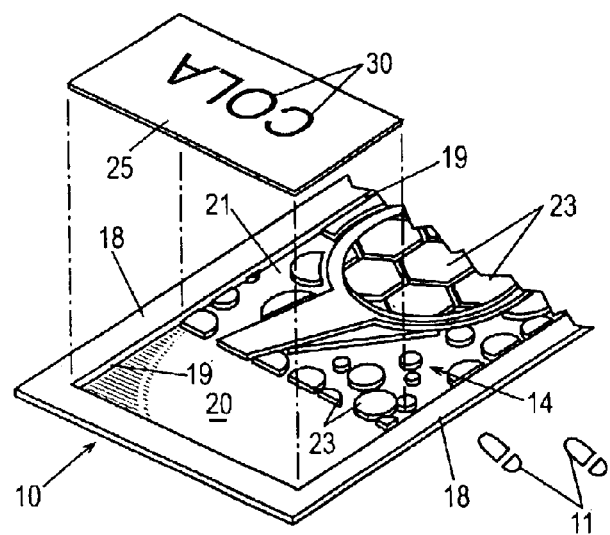
FIG. 2 is a partial, expanded perspective illustration of the advertising mat shown in FIG. 1, showing a graphics sheet expanded away from its position on the mat.

As illustrated in FIG. 2, the mat 10 has a raised border 18, including a shallow ledge 19 that projects vertically upwardly from the central portion 20 of each side section 15 and 16, and also upwardly from the central portion 21 of the central section 14.

As shown, the central section 14 can include vertically raised designs 23 arranged in closely spaced relationship so as to form a walking surface for pedestrians and to also form lowered spaces or relief between the designs for the accumulation of dirt, etc. The central section 14 can also include track control media, such as tufted nylon, polypropylene, rayon, etc., that functions to remove dirt and debris from the feet of pedestrians. Embodiments are also envisioned wherein the central section 14 is removable from the mat 10 so as to facilitate cleaning the mat 10.

Graphics sheets 25 are removably placed in the recessed central portion 20 of the side sections 15 and 16. The graphics sheets are of a length and width that correspond to the length and width of the recessed portions 20, so as to substantially fill the recessed portions at opposed ends of the mat, outside of the anticipated pedestrian path 11.

As shown in FIG. 3, each of the graphics sheets 25 may be polystyrene sheet 26 or vinyl sheet or a sheet of other material that is durable and user safe and friendly, typically of white or off-white color or of other color that forms a proper background for the graphics to be applied thereto. The graphics sheets have a releasable adhesive 28 applied thereto on the bottom surface and a peel off cover sheet 29 is temporarily applied to the releasable adhesive so as to protect the adhesive prior to the time when the graphics sheets will be applied to the mat.

The upper surface of the graphics sheet has printed thereon the graphics 30 desired by the producer, usually the name and image of the product or service to be sold at the site of the retail establishment. Typically, the graphics have been applied to the graphics sheet and a laminate 31 of clear vinyl is applied to the graphics sheet, over the graphics, so as to protect the graphics from wear and discoloration, and to form a non-skid and scuff resistant surface.

When the advertising floor mat 10 is to be placed in a retail store, etc., the graphics sheets 25 will be applied to the opposed side sections 15 and 16 of the mat by peeling away the protective peel off cover sheet 29 from the bottom surface of the graphics sheet, and then accurately placing the graphics sheet in the recessed central portion 20 of the opposed side sections of the mat. The borders 18 of the mat protects the edges of the graphics sheets 25 from inadvertent detachment from the mat. In that the graphics sheets 25 are releaseably adhesively attached to the advertising mat 10, the graphics sheets 25 can be removed from the advertising floor mat and replaced so as to change the ad carried by the mat and/or refresh the ads with a replacement ad from time to time so as to avoid extended use of advertisements that have become worn, discolored, obsolete or otherwise undesirable.

FIG. 4 discloses another preferred embodiment of the advertising mat 10. In the preferred embodiment shown in FIG. 4, the graphics sheets 25 that are to be placed in the opposed recessed side sections 15 and 16 are first adhesively attached to panels 27 (FIG. 5) that have substantially the same length and width as the opposed recessed side sections 15 and 16. Once the graphics sheets 25 have been adhesively connected to their respective panels 27, the panels 27 are inserted into their respective opposed recessed side section 15 and 16.

Figure 5:
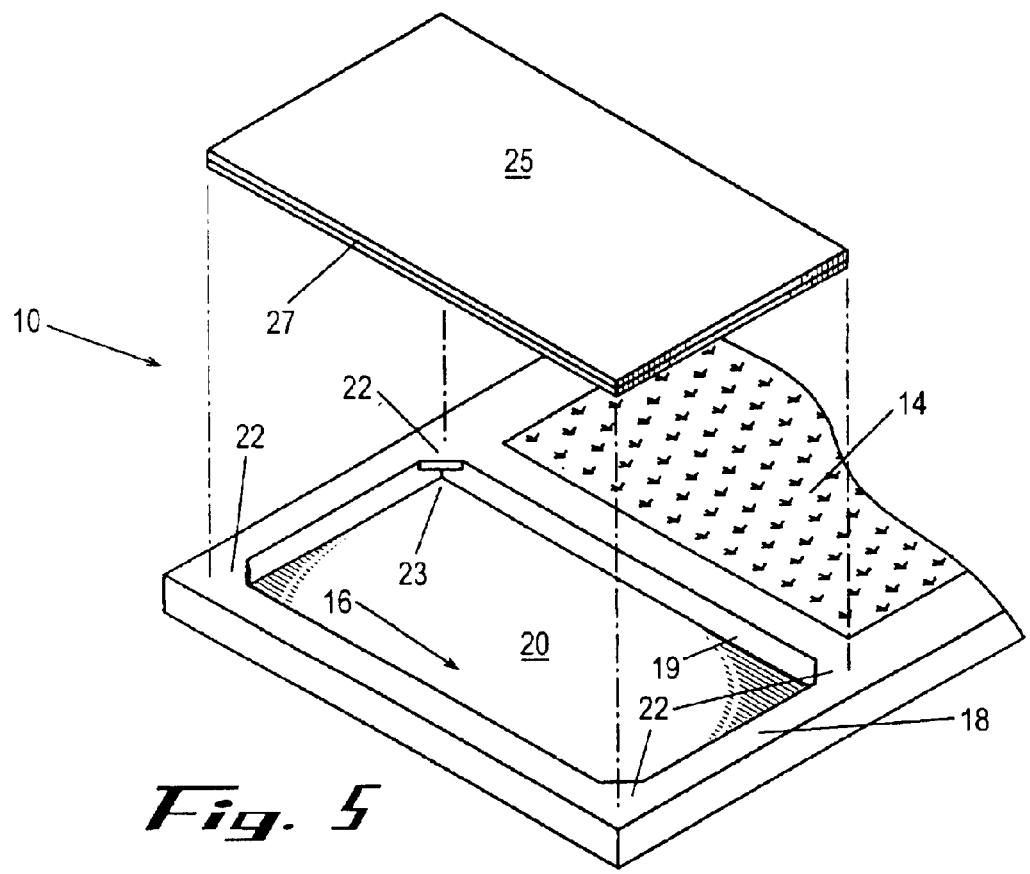
FIG. 5 is a partial, expanded perspective illustration of the advertising mat shown in FIG. 4, showing a graphics sheet expanded away from its position on the mat.

Although the panels 27 can be simply placed in their respective opposed recessed side sections 15 and 16, it is desirable to utilize some positive means of retaining the panels 27 within the side sections 15 and 16. Adhesive can be used. As shown in FIG. 5, another method of retaining the panels 27 within the opposed recessed side sections 15 and 16 is the utilization of hold down tabs 22 disposed in the corners of each of the opposed side sections 15 and 16. Preferably, each opposed recessed side section 15 and 16 will have a hold down tab 22 at each of its corners for its respective panel 27. As shown, each hold down tab 22 extends over a corner of a side section and defines an approximately triangular slot or recess 23 between the hold down tab 22 and the corner of the associated recessed side sections 15 and 16, the recess being disposed in the shallow ledge 19 formed by the raised border 18. Preferably, the combined thickness of the panel 27 and its associated graphics sheets 25 is less than the height of the shallow ledge 19, thereby permitting the raised border 18 to afford protection to the panel 27 and graphics sheets 25.

Mounting the graphics sheets 25 to a panel 27 rather than directly to the mat 10 permits the graphics sheets 25 to be used with multiple mats 10. Therefore, if it is desirable to clean the advertising mat 10 yet continue to use the same graphics sheets 25, the panels 27 are simply removed from the opposed side sections 15 and 16 of the mat 10 to be removed for cleaning and placed in the opposed side sections 15 and 16 of the replacement advertising mat 10. The panels 27 extend the service life of the graphics sheets 25, thereby reducing the cost of utilizing the advertising mat 10. Note, although not shown, embodiments are envisioned wherein the central section 14 of the advertising mat 10 also can bear advertising indicia. The ad in the central portion of the advertising floor mat can be permanent as by molding or tufting the information into the mat. However, a generic central portion 14 increases flexibility of use of the mats in that a stock pile of mats 10 with advertising specific to a given location does not need to be maintained.

As shown in FIGS. 4 and 5, the central section 14 of the advertising mat 10 includes a track control media such as nylon, polypropylene, rayon, etc., which can be tufted. Typically, the central section 14 of the advertising mat 10 is non-releasably attached to the advertising mat 10. However, embodiments are envisioned wherein the track control media is secured to a substrate (not shown) which is in turn placed within a recessed portion of the mat 10. The substrate is releasably connected to the mat 10 by mechanical means, such as the previously discussed hold down tabs 22. This allows the central section 14 of the mat 10 to be periodically cleaned without having to lift and remove the entire advertising mat 10 from the premises on which it is being used.

Figure 6:
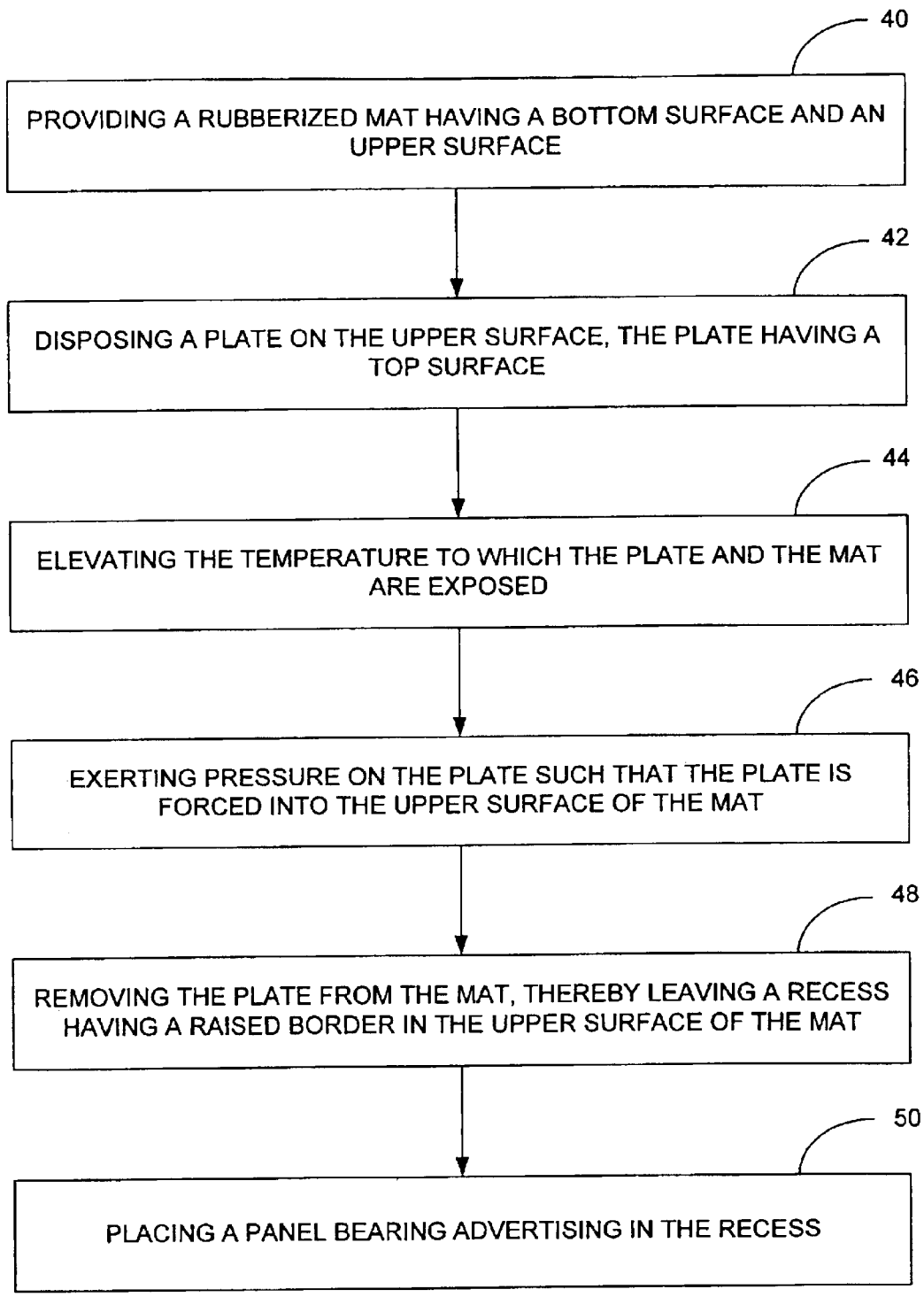
FIG. 6 is a flow diagram illustrating the process of fabricating a preferred embodiment of the advertising mat.

FIG. 6 is a flow diagram illustrating the process of fabricating a preferred embodiment of the advertising mat 10. First, as shown in block 40, a rubberized mat 10 having a bottom surface and an upper surface 12 is provided. Next, as shown in block 42, a plate 33 is disposed on the upper surface 12 of the mat. Typically, the plate 27 will have the dimensions and shape of the desired recess to be formed in the upper surface 12 of the mat 10. Preferably, the plate 33 is formed from a metal, such as aluminum. Next, the temperature to which the mat 10 and plate 33 are exposed is elevated, as shown in block 44, resulting in the plate and mat becoming heated. By elevating the temperature, the rubber of the mat 10 will flow more readily, thereby allowing the hot plate 33 to be received within the mat 10. As shown in block 46, force is exerted on the plate 33, with the plate being urged into the mat, thereby forcing the plate 33 into the upper surface 12 of the mat 10. As the plate 33 moves into the upper surface 12 of the mat 10, the surrounding rubber is urged upwardly about the edges of the plate 33, thereby forming the shallow ledge 19 of the opposed side sections 15 and 16. Next, the mat 10 and embedded plate 33 are cooled such that the plate 33 can eventually be removed from the mat 10, thereby leaving a recess in the mat 10, as shown in block 48. Once the mat 10 has adequately cooled, a graphics sheet 25, either alone or adhesively attached to a panel 27, can be placed in the recess, as shown in block 50.

Figure 7:
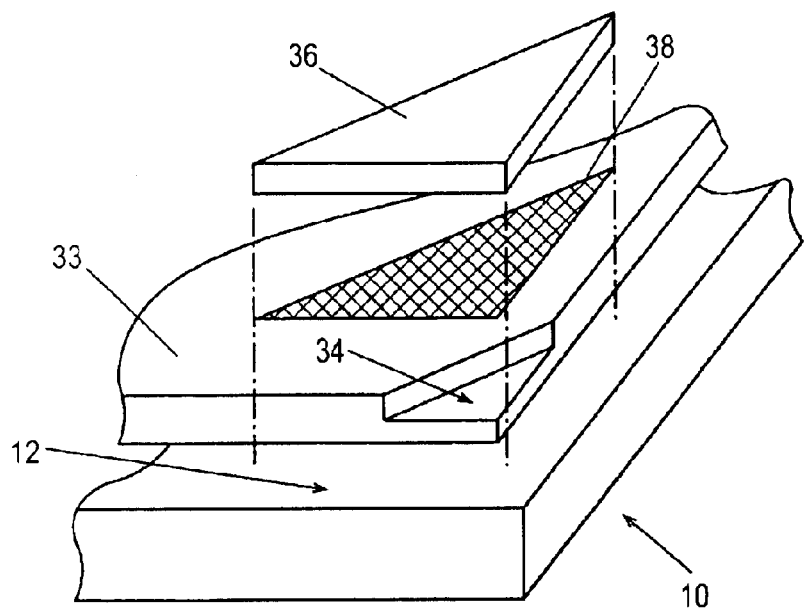
FIG. 7 is a partial, expanded illustration of the elements used to form a hold down tab for the preferred embodiment of the mat shown in FIGS. 4 and 5.

Referring now to FIG. 7, additional steps are required to form the hold down tabs 22 disclosed by the preferred embodiment of the advertising mat 10, shown in FIGS. 4 and 5. In the preferred embodiment shown, the corners 34 of the plate 33 used to form the opposed side sections 15 and 16 are thinned to approximately half the thickness of the plate 33. Typically, a plate 33 will be approximately 60 mils thick, meaning the corners 34 will be thinned to approximately 30 mils. After the plate 33 has been disposed on the upper surface 12 of the mat 10, a piece of reinforcing fabric 38 is disposed to cross the thinned corner 34 of the plate 33 such that it extends beyond the edges of the plate 33. Next, a rubber piece 36 is disposed on top of the reinforcing fabric 38, and similarly extends beyond the edges of the plate 33. The reinforcing fabric 38 and rubber piece 36 ideally extend beyond the edges of the plate 33 so that they will make sufficient contact with the upper surface 12 of the mat 10. Therefore, as the rubber piece 36 is exposed to elevated temperatures and pressure, the rubber piece 36 will flow through the reinforcing fabric 38 and adequately bond with the rubber of the upper surface 12 of the mat 10. Also, thinning the corners 34 of the plate 33 helps ensure that the hold down tabs 22 will be formed substantially within the plane of the upper surface 12 of the mat 10. Therefore, the hold down tabs 22 will remain substantially flat rather than "bulging" upward. However, it is not necessary to thin the corners 34 of the plates 33 when forming all embodiments.

It should be emphasized that the above-described embodiments of the present advertising mat 10, in particular, any "preferred" embodiments, are merely possible examples of implementations that set forth a clear understanding of the principles of the advertising mat 10. Variations and modifications may be made to the above-described embodiments of the advertising mat 10 without departing substantially from the spirit and principles of the advertising mat 10. All such modifications and variations are intended to be included herein within the scope of this disclosure of the advertising mat 10 and protected by the following claims.

What is claimed is:

1. An advertising mat bearing advertisements, comprising:

a floor mat having a bottom surface for engaging a floor, and an upper surface over which pedestrian traffic will pass;

said floor mat upper surface including a central section adapted for placement in a pedestrian path and for engagement by pedestrian traffic, and opposed side sections straddling said central section for placement adjacent pedestrian traffic;

said opposed side sections each having a substantially smooth surface compatible with adhesive connection and removal of sheet material;

graphics sheets each having opposed upper and lower surfaces, said upper surfaces of said graphics sheets bearing advertising indicia, said lower surfaces of said graphics sheets bearing releasable adhesive; and one of said graphics sheets disposed in each of said side sections and adhered to said substantially smooth surfaces of said side sections, leaving said central section without a graphics sheet and available for pedestrian traffic.

2. The advertising mat of claim 1, wherein the releasable adhesive of said graphics sheets adheres said graphics sheets to said side sections.

3. The advertising mat of claim 1, wherein said central section includes a visual design formed of vertical portions of said floor mat.

4. The advertising mat of claim 1, wherein said central portion further comprises a track control media adapted for containment of debris related to pedestrian traffic.

5. The advertising mat of claim 1, wherein said floor mat is perforated.

6. The advertising mat of claim 1 further comprising:

a pair of panels, each of said panels including a top surface and configured for placement in one of said opposed side sections;

one of said graphics sheets is applied to each of said panels with the releasable adhesive of said graphics sheets adhering said graphics sheets to said panels; and wherein said panels are disposed in said opposed side sections.

7. The advertising mat of claim 6, further comprising:

at least one corner hold down tab disposed in each of said opposed side sections; and wherein said corner hold down tabs engage said panels and secure said panels in said opposed side sections.

8. The advertising mat of claim 6, wherein said opposed side sections each include a raised border configured to surround said panel disposed therein.

9. An advertising mat bearing advertisements, comprising:

a floor mat having a bottom surface for engaging a floor, and an upper surface over which pedestrian traffic will pass;

said floor mat upper surface including a traffic section adapted for placement in a pedestrian path, and at least one side section having a substantially smooth surface and a plurality of hold down tabs positioned about said smooth surface, said side section being adjacent said traffic section;

a panel including a top surface bearing advertising indicia, said panel configured for placement in said side section in engagement with said substantially smooth surface; and wherein said plurality of hold down tabs releasably secure said panel in said side section.

10. The advertising mat of claim 9, further comprising a graphics sheet having opposed upper and lower surfaces, said upper surface bearing advertising indicia and said lower surface bearing releasable adhesive, said releasable adhesive adhering said graphics sheet to said panel.

11. The advertising mat of claim 10, wherein said at least one side section further comprises a pair of said side sections disposed on opposing sides of said traffic section.

12. The advertising mat of claim 9, wherein said traffic section further comprises a track control media adapted for containment of debris related to pedestrian traffic.

13. The advertising mat of claim 9, wherein said panel is rectangular and wherein each of said plurality of hold down tabs engages a corner of said panel.

14. The advertising mat of claim 9, wherein said floor mat is perforated.

15. The advertising mat of claim 9, wherein said at least one side section is a recess having substantially the same dimensions as said panel.

16. An advertising mat bearing advertisements, comprising:

a floor mat having a bottom surface for engaging a floor, and an upper surface over which pedestrian traffic will pass;

said floor mat upper surface including an upwardly facing central section adapted for placement in a pedestrian path and for engagement by pedestrian traffic, and at least one upwardly facing side section adjacent said central section for placement adjacent pedestrian traffic;

said upwardly facing side section having a substantially smooth surface compatible with the connection thereto and removal therefrom of sheet material;

a graphics sheet for each upwardly facing side section, each said graphics sheet having opposed upper and lower surfaces, said upper surface of said graphics sheet bearing visible advertising indicia, said lower surface of said graphics sheet having a substantially flat surface for flat engagement with said upwardly facing side section; and a connector holding said graphics sheet to said side surface, leaving said central section without a graphics sheet and available for pedestrian traffic.

17. The advertising mat of claim 16, wherein said connector comprises releasable adhesive.

18. The advertising mat of claim 16, wherein said central portion further comprises a track control media adapted for containment of debris related to pedestrian traffic.

* * * * *